United States Patent
Chang et al.

(10) Patent No.: US 8,971,575 B2
(45) Date of Patent: Mar. 3, 2015

(54) SYSTEMS AND METHODS FOR TRACKING OBJECTS

(71) Applicant: Cyberlink Corp., Shindian (TW)

(72) Inventors: Ming-Hsiu Chang, Douliu (TW); Chih-Chao Ma, Taichung (TW)

(73) Assignee: Cyberlink Corp., Shindian, Taipei (TW)

( * ) Notice: Subject to any disclaimer, the term of this patent is extended or adjusted under 35 U.S.C. 154(b) by 351 days.

(21) Appl. No.: 13/684,451

(22) Filed: Nov. 23, 2012

(65) Prior Publication Data
US 2014/0146997 A1  May 29, 2014

(51) Int. Cl.
*G06K 9/00* (2006.01)
*G06T 7/20* (2006.01)

(52) U.S. Cl.
CPC ............... *G06T 7/2046* (2013.01); *G06T 7/208* (2013.01); *G06T 2207/10016* (2013.01); *G06T 2207/20076* (2013.01)
USPC .......................................... 382/103; 382/100

(58) Field of Classification Search
None
See application file for complete search history.

(56) References Cited

U.S. PATENT DOCUMENTS

| | | | |
|---|---|---|---|
| 6,674,877 B1 * | 1/2004 | Jojic et al. | 382/103 |
| 2003/0219146 A1 * | 11/2003 | Jepson et al. | 382/103 |
| 2003/0228032 A1 * | 12/2003 | Rui et al. | 382/103 |
| 2006/0291696 A1 * | 12/2006 | Shao et al. | 382/103 |
| 2009/0226037 A1 | 9/2009 | Yang et al. | |
| 2010/0046830 A1 * | 2/2010 | Wang et al. | 382/164 |
| 2011/0158474 A1 | 6/2011 | Srikrishnan et al. | |
| 2012/0057748 A1 * | 3/2012 | Katano | 382/103 |

FOREIGN PATENT DOCUMENTS

WO  2008125854 A1  10/2008

OTHER PUBLICATIONS

Erdem et al. "Video Object Tracking with Feedback of Performance Measures" IEEE Transactions on Circuits and Systems for Video Technology, vol. 13, No. 4, Apr. 2003.
Chung et al. "Integrating Region and boundary information for spacially coherent object tracking" Image and Vision Computing 24 (2006) 680-692.

* cited by examiner

*Primary Examiner* — Avinash J Yentrapati
(74) *Attorney, Agent, or Firm* — McClure, Qualey & Rodack, LLP

(57) ABSTRACT

Various embodiments are disclosed for performing object tracking. One embodiment is a system for tracking an object in a plurality of frames, comprising a probability map generator configured to generate a probability map by estimating probability values of pixels in the frame, wherein the probability of each pixel corresponds to a likelihood of the pixel being located within the object. The system further comprises a contour model generator configured to identify a contour model of the object based on a temporal prediction method, a contour weighting map generator configured to derive a contour weighting map based on thickness characteristics of the contour model, a tracking refinement module configured to refine the probability map according to weight values specified in the contour weighting map, and an object tracker configured to track a location of the object within the plurality of frames based on the refined probability map.

24 Claims, 12 Drawing Sheets

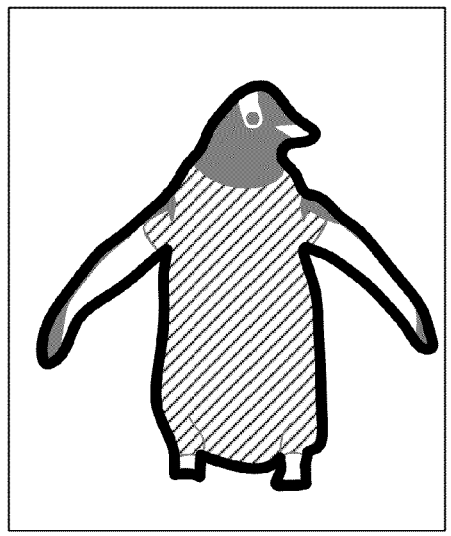
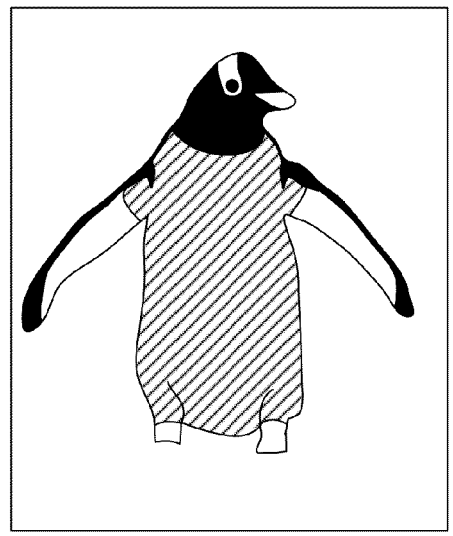
FIG. 10A                FIG. 10B
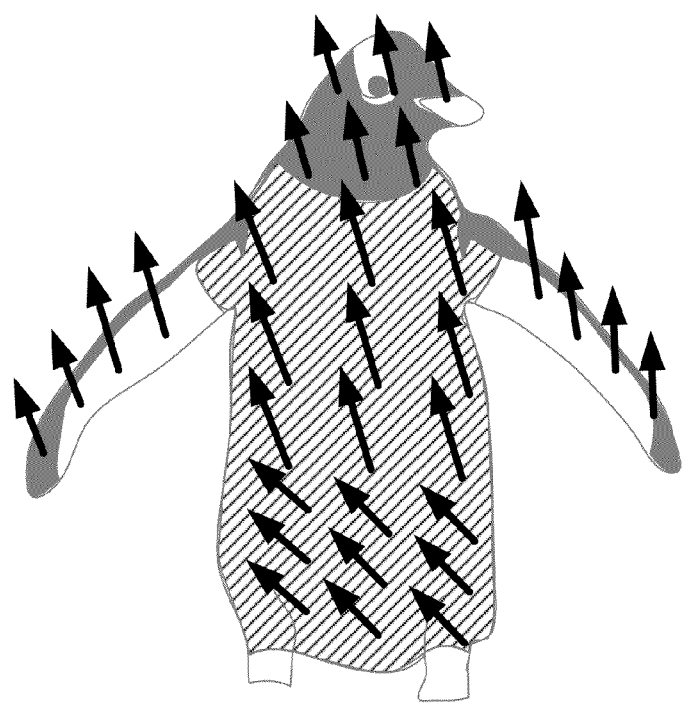
FIG. 10C

SYSTEMS AND METHODS FOR TRACKING OBJECTS

TECHNICAL FIELD

The present disclosure generally relates to video processing, and more particularly, to a system and method for tracking objects utilizing a contour weighting map.

BACKGROUND

Over the years, digital content has gained increasing popularity with consumers. With the ever-growing amount of digital content available to consumers through the Internet using computers, smart phones, and other sources, consumers have access to a vast amount of content. Furthermore, many devices (e.g., smartphones) and services are readily available that allow consumers to capture and generate video content.

Upon capturing or downloading video content, the process of tracking objects is commonly performed for editing purposes. For example, a user may wish to augment a video with special effects where one or more graphics are superimposed onto an object. In this regard, precise tracking of the object is important. However, challenges may arise when tracking objects, particularly as the object moves from frame to frame. This may cause, for example, the object to vary in shape and size. Additional challenges may arise when the object includes regions or elements that easily blend in with the background. This may be due to the thickness and the color make-up of the elements.

SUMMARY

Briefly described, one embodiment, among others, is a system for tracking an object in a plurality of frames, comprising a probability map generator configured to generate a probability map by estimating probabilities of pixels in the frame, wherein the probability of each pixel corresponds to a likelihood of the pixel being located within the object. The system further comprises a contour model generator configured to identify a contour model of the object based on a temporal prediction method, a contour weighting map generator configured to derive a contour weighting map based on thickness characteristics of the contour model, a tracking refinement module configured to refine the probability map according to weight values specified in the contour weighting map, and an object tracker configured to track a location of the object within the plurality of frames based on the refined probability map.

Another embodiment is a non-transitory computer-readable medium embodying a program executable in a computing device for tracking an object in a plurality of frames, comprising code that generates a probability map by estimating probabilities of pixels in the frame, wherein the probability of each pixel corresponds to a likelihood of the pixel being located within the object. The program further comprises code that determines a contour model of the object defining a contour of the object, code that generates a contour weighting map from the contour model according to relatively thin regions within the contour model, wherein thin regions are identified according to thickness values calculated by at least one of a distance measurement and morphological analysis, code that refines the probability map according to weight values specified in the contour weighting map, and code that tracks a location of the object within the plurality of frames based on the refined probability map.

Another embodiment is a method for tracking an object in a plurality of frames that comprises generating a probability map by estimating probabilities of pixels in the frame, wherein the probability of each pixel corresponds to a likelihood of the pixel being located within the object. The method further comprises determining a contour model of the object defining a contour of the object, generating a contour weighting map from the contour model according to thickness characteristics of the contour model, refining the probability map according to weight values specified in the contour weighting map, and tracking a location of the object within the plurality of frames based on the refined probability map.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 10A-E illustrate the tracking operation involving the object contour performed by the video editing system of FIG. 1 in accordance with various embodiments of the present disclosure.

DETAILED DESCRIPTION

The process of tracking one or more objects within a video stream may be challenging, particularly when the object moves from frame to frame as the object may vary in shape and size when moving from one position/location to another. Additional challenges may arise when the object includes regions or elements that easily blend in with the background. To illustrate, reference is made to FIG. 5, which illustrates a frame 402 among a series of frames in which an object 404 (i.e., a penguin) is being tracked.

Some conventional systems may implement a segmentation-based tracking algorithm to track the object 404 where color and edge information across frames are utilized to segment a window containing the object 404 in order to track the object 404. However, one perceived shortcoming is that a segmentation-based tracking approach that primarily analyzes color and edge information may result in poor tracking of the object 404, particularly when portions of the object 404 tend to blend in with the background. In the example shown in FIG. 5, the flippers of the penguin may be difficult to track as the lighter portions of the flippers may tend to blend in with the background (e.g., the snow). As such, the tracking system may lose track of the flipper as only a thin portion of each flipper is black and easily distinguishable from the background.

Various embodiments are disclosed for improving the tracking of objects within an input stream of frames, even for objects that include "thin" elements or portions that may be lost during tracking performed by conventional systems. For some embodiments, a contour weighting map is derived that places heavier weighting on thin elements during the tracking process in order to maintain tracking of these elements. One embodiment, among others, is a method for tracking an object in a plurality of frames.

The method comprises determining a contour model of the object defining a contour of the object and generating a contour weighting map from the contour model according to thickness values corresponding to elements within the contour model. As described in more detail below, various techniques may be implemented for identifying "thin" elements of the object. The method further comprises tracking a location of the object within the plurality of frames based on the contour model and the contour weighting map.

Figure 1:
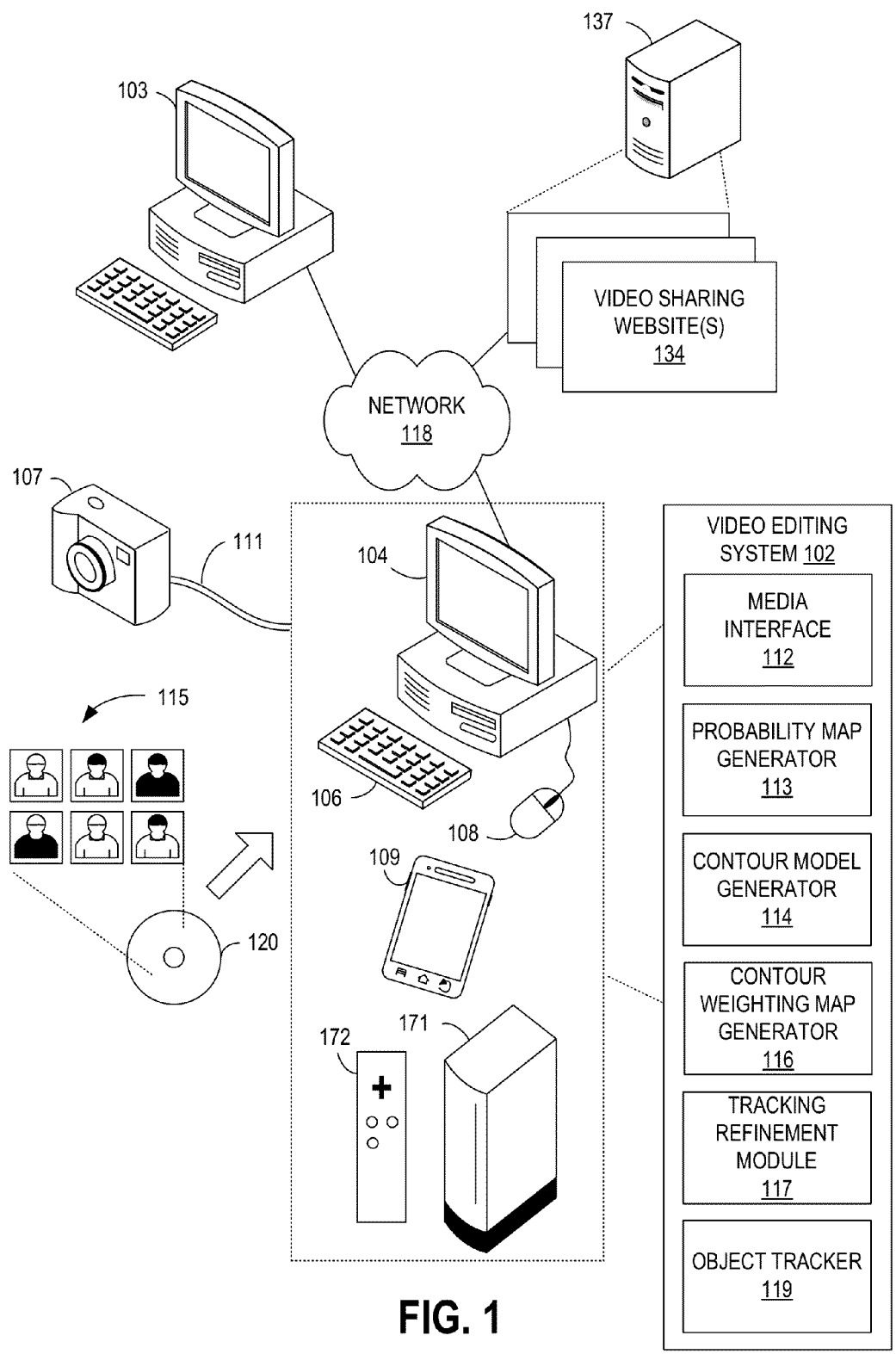
FIG. 1 is a block diagram of a video editing system for facilitating object tracking in accordance with various embodiments of the present disclosure.

A description of a system for facilitating object tracking is now described followed by a discussion of the operation of the components within the system. FIG. 1 is a block diagram of a video editing system 102 in which embodiments of the object tracking techniques disclosed herein may be implemented. The video editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the video editing system 102 is embodied as a smartphone 109 or tablet, the user may interface with the video editing system 102 via a touchscreen interface (not shown). In other embodiments, the video editing system 102 may be embodied as a video gaming console 171, which includes a video game controller 172 for receiving user preferences. For such embodiments, the video gaming console 171 may be connected to a television (not shown) or other display 104.

The video editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the video editing system 102. As one of ordinary skill will appreciate, the digital media content 115 may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 1, the media interface 112 in the video editing system 102 may also be configured to retrieve digital media content 115 directly from a digital camera 107 where a cable 111 or some other interface may be used for coupling the digital camera 107 to the video editing system 102. The video editing system 102 may support any one of a number of common computer interfaces, such as, but not limited to IEEE-1394 High Performance Serial Bus (Firewire), USB, a serial connection, and a parallel connection.

The digital camera 107 may also be coupled to the video editing system 102 over a wireless connection or other communication path. The video editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the video editing system 102 may receive digital media content 115 from another computing system 103. Alternatively, the video editing system 102 may access one or more video sharing websites 134 hosted on a server 137 via the network 118 to retrieve digital media content 115.

The probability map generator 113 in the video editing system 102 is configured to generate a probability map by estimating probabilities of pixels in the frame of the digital media content 115 being processed, where the probability of each pixel corresponds to a likelihood of the pixel being located within the object being tracked. For some embodiments, the probability map generator 113 is further configured to construct a foreground model according to a tracked region in a prior frame, construct a background model according to a region other than the tracked region in the same or different prior frame, and estimate the probabilities according to similarities of pixel values in a current frame with respect to both the foreground and background models, as described in more detail below.

The contour model generator 114 in the video editing system 102 is configured to analyze media content 115 obtained by the media interface 112 and derive a contour model corresponding to an object to be tracked by the video editing system 102. For some embodiments, the contour model may be derived based on a temporal prediction method or optical flow information corresponding to a current frame and a previous frame of the media content 115.

The contour weighting map generator 116 is configured to generate a contour weighting map comprising weight values for each pixel in the contour model. As described in more detail below, various factors may be considered in constructing the contour weighting map. Typically, fast movement by an object decreases the accuracy in tracking an object when applying temporal prediction to derive the contour model. In this regard, relatively lower weighting values may be assigned by the contour weighting map generator 116 when fast movement by the object is detected by the video editing system 102.

Another factor relied upon in constructing the contour weighting map is the thickness values of various elements of the object. As discussed earlier, conventional systems that utilize segmentation-based tracking that relies primarily on color and edge information may fail to track thinner portions of the object, particularly, where areas surrounding the thinner portions tend to blend in with the background. In accordance with various embodiments, the thickness values of various elements are calculated in order to identify thin portions of the object.

The tracking refinement module 117 refines the probability map according to weight values specified in the contour weighting map. The refined probability map is then utilized by the object tracker 119 to track the object where heavier emphasis is placed on portions of the object that have higher weight values relative to remaining portions of the object. The object tracker 119 thus tracks the object by applying the contour weighting map to the contour model derived earlier. By focusing on "thin" elements or portions of the object, these elements may be accurately tracked. In general, a region with a higher weight value corresponds to a region having a greater degree of curvature and is generally easier to track.

Figure 2:
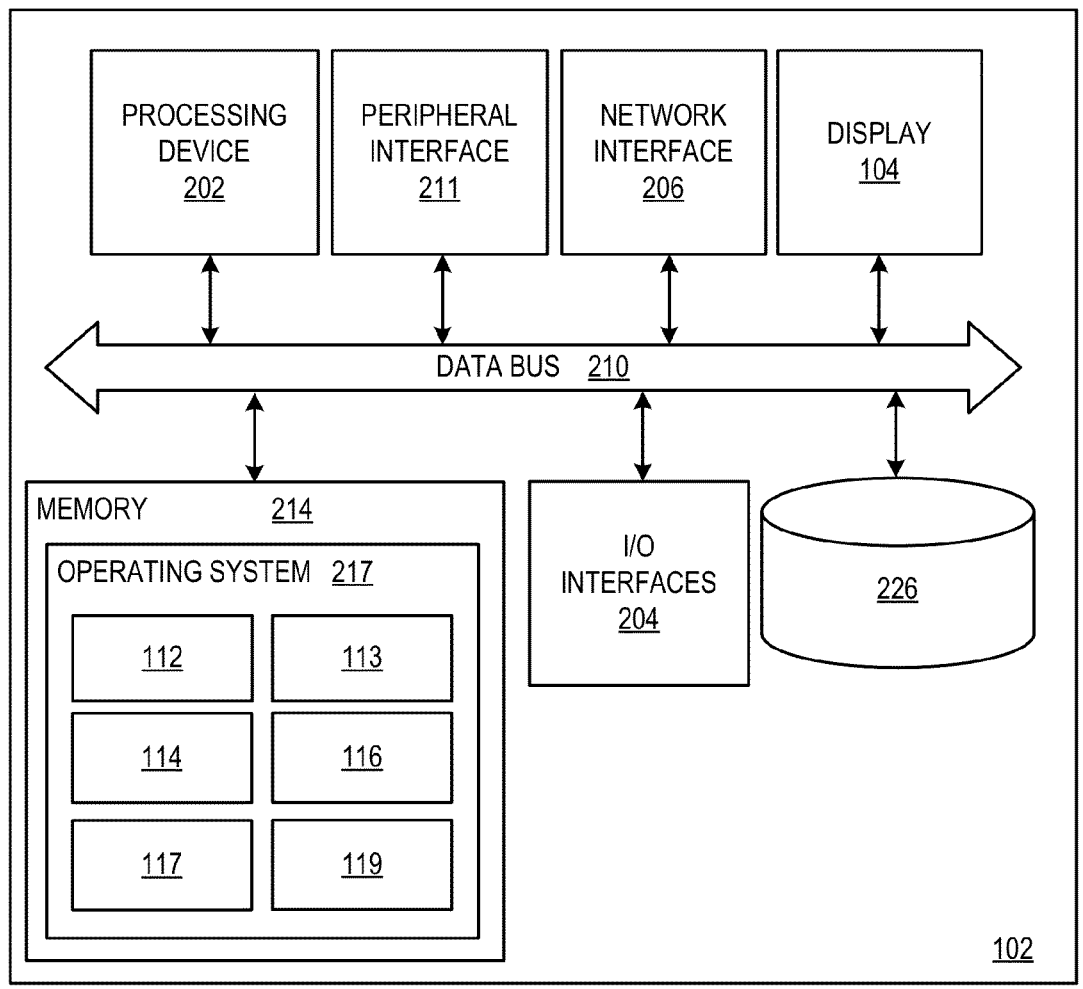
FIG. 2 is a detailed view of the video editing system device of FIG. 1 in accordance with various embodiments of the present disclosure.

FIG. 2 is a schematic diagram of the video editing system 102 shown in FIG. 1. The video editing system 102 may be embodied in any one of a wide variety of wired and/or wireless computing devices, such as a desktop computer, portable computer, dedicated server computer, multiprocessor computing device, smartphone 109 (FIG. 1), tablet computing device, and so forth. As shown in FIG. 2, the video editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the video editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, probability map generator 113, contour model generator 114, contour weighting map generator 116, tracking refinement module 117, object tracker 119) of the video editing system 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the video editing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The video editing system 102 may communicate with one or more computing devices via the network interface 206 over the network 118 (FIG. 1). The video editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
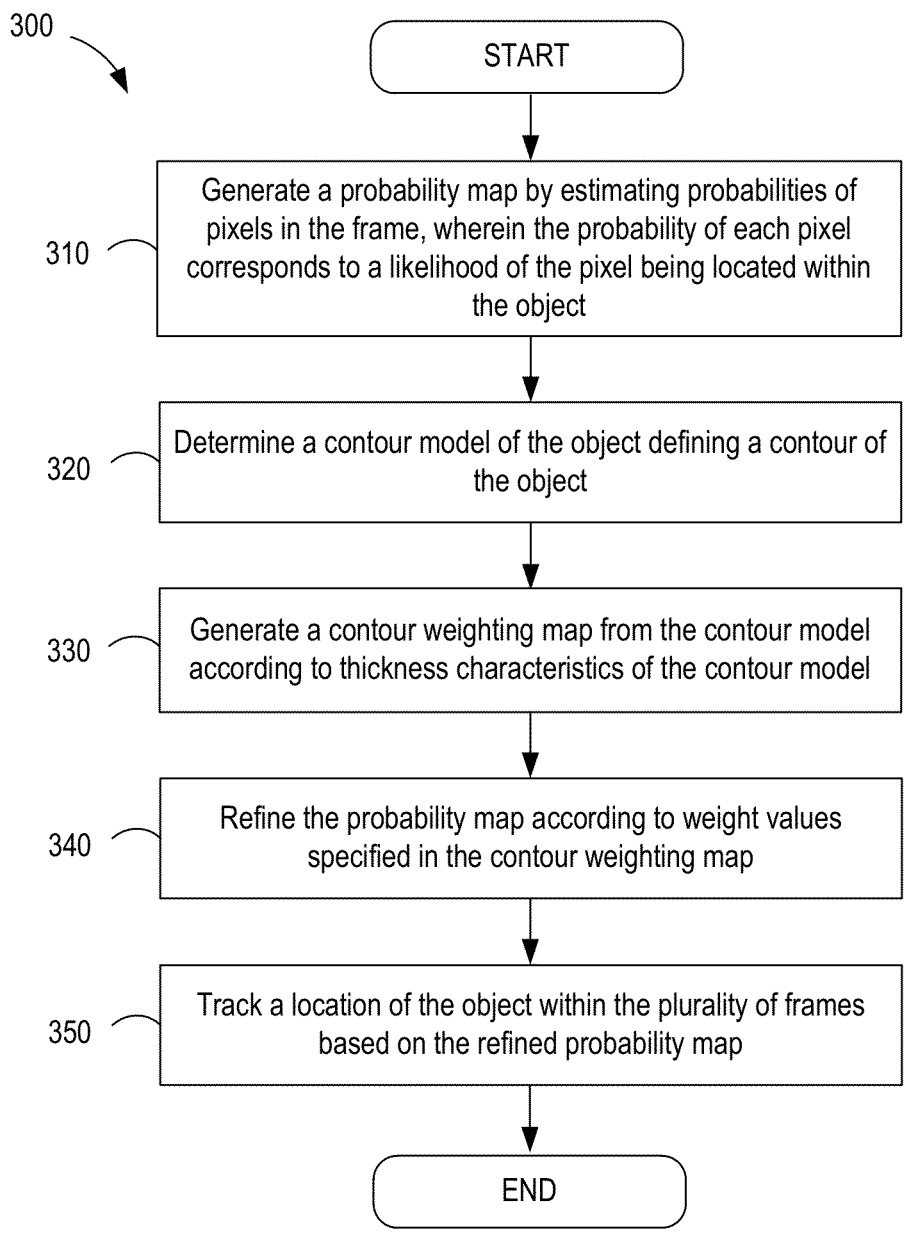
FIG. 3 is a top-level flowchart illustrating examples of functionality implemented as portions of the video editing system of FIG. 1 for facilitating object tracking according to various embodiments of the present disclosure.

Reference is made to FIG. 3, which is a flowchart 300 in accordance with one embodiment for facilitating object tracking performed by the video editing system 102 of FIG. 1. It is understood that the flowchart 300 of FIG. 3 provides merely an example of the many different types of functional arrangements that may be employed to implement the operation of the various components of the video editing system 102 (FIG. 1). As an alternative, the flowchart of FIG. 3 may be viewed as depicting an example of steps of a method implemented in the video editing system 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Beginning with block 310, the probability map 113 (FIG. 1) generator generates a probability map by estimating probabilities of pixels in the frame, wherein the probability of each pixel corresponds to a likelihood of the pixel being located within the object. In block 320, the contour model generator 114 (FIG. 1) determines a contour model of the object defining a contour of the object.

In block 330, the contour weighting map generator 116 (FIG. 1) generates a contour weighting map from the contour model according to thickness characteristics of the contour model. In block 340, the tracking refinement module 117 (FIG. 1) refines the probability map according to weight values specified in the contour weighting map. In block 350, the object tracker 119 (FIG. 1) tracks a location of the object within the plurality of frames based on the refined probability map.

Figure 4:
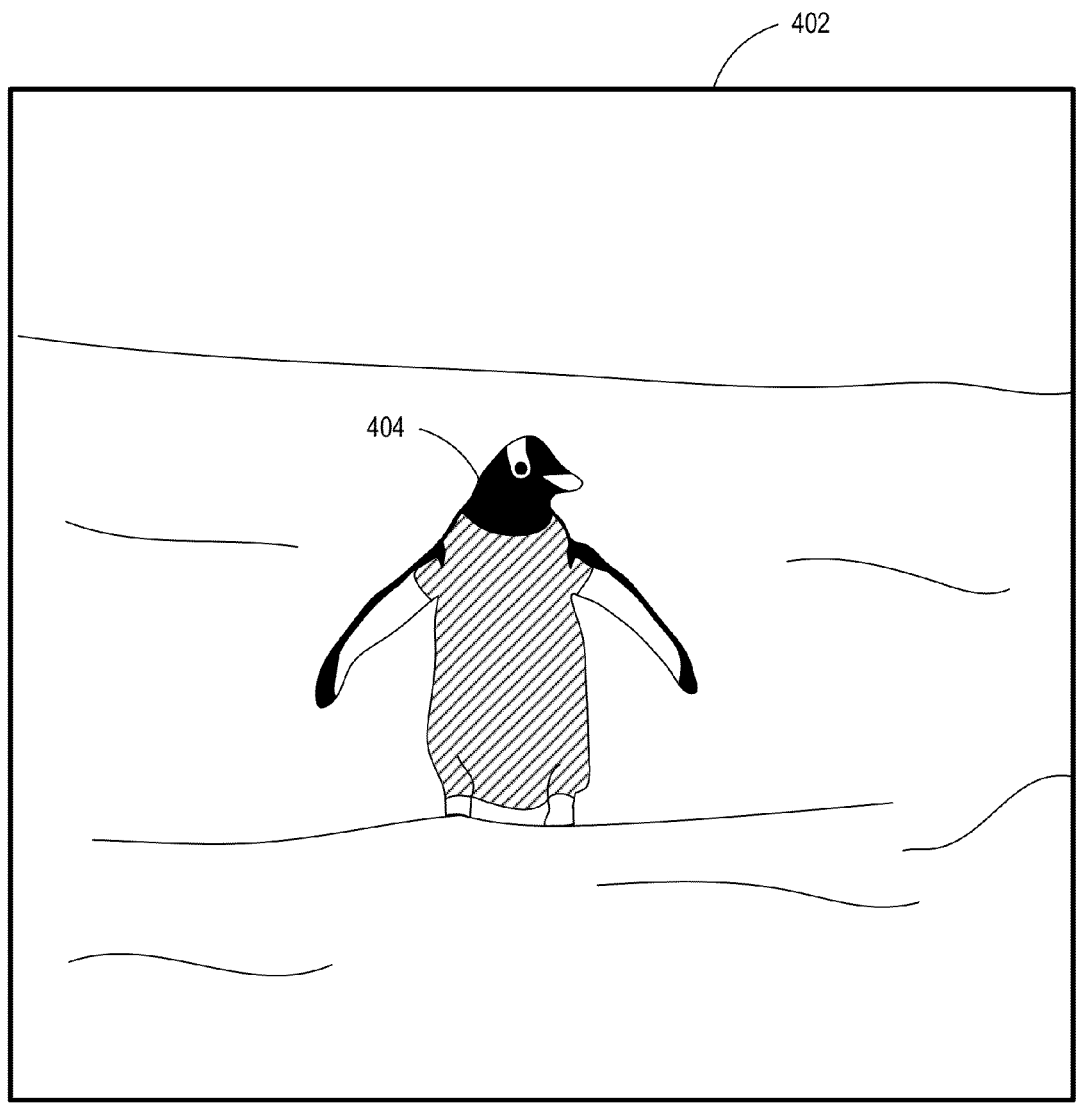
FIG. 4 depicts an example digital image to be processed by the video editing system of FIG. 1 in accordance with various embodiments of the present disclosure.
Figure 5:
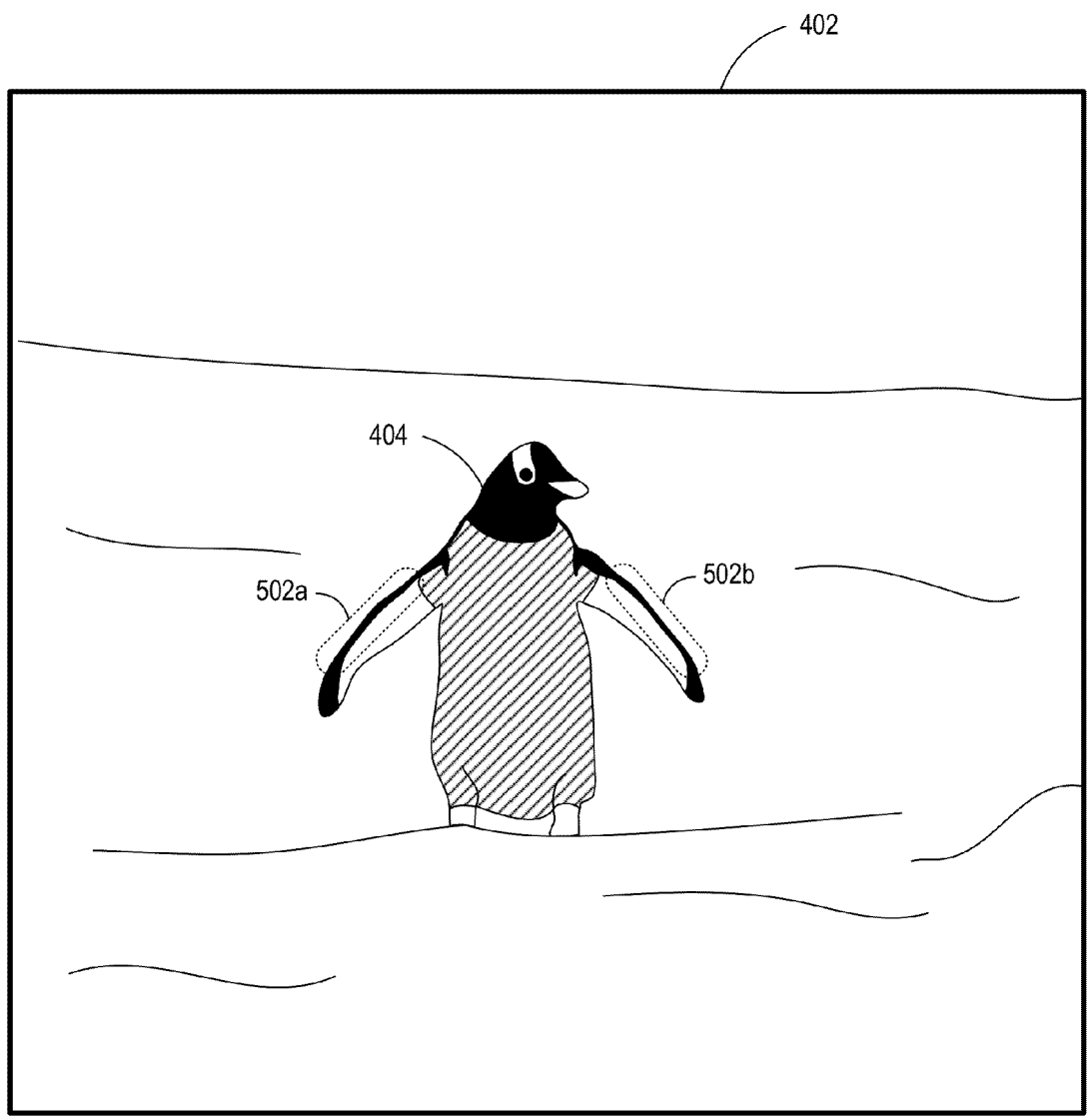
FIG. 5 illustrates thin regions of an object to be tracked by the video editing system of FIG. 1 in accordance with various embodiments of the present disclosure.

To further illustrate the various concepts disclosed, reference is made to FIGS. 4, 5, and 7-9, which illustrate various aspects of object tracking in accordance with various embodiments of the present disclosure. Shown in FIG. 4 is an example of an object 404 (i.e., a penguin) to be tracked in a frame 402. As shown in FIG. 4, the object 404 includes various elements (e.g., the flippers) which vary in size, shape, color, etc. As shown in FIG. 5, the object 404 includes various elements or regions that blend in with the background, thereby resulting in "thin" regions 502a, 502b due to the thin portions of the elements (e.g., the dark-colored portion of both flippers) that are in contrast with the background of the image in the frame 402.

Figure 6:
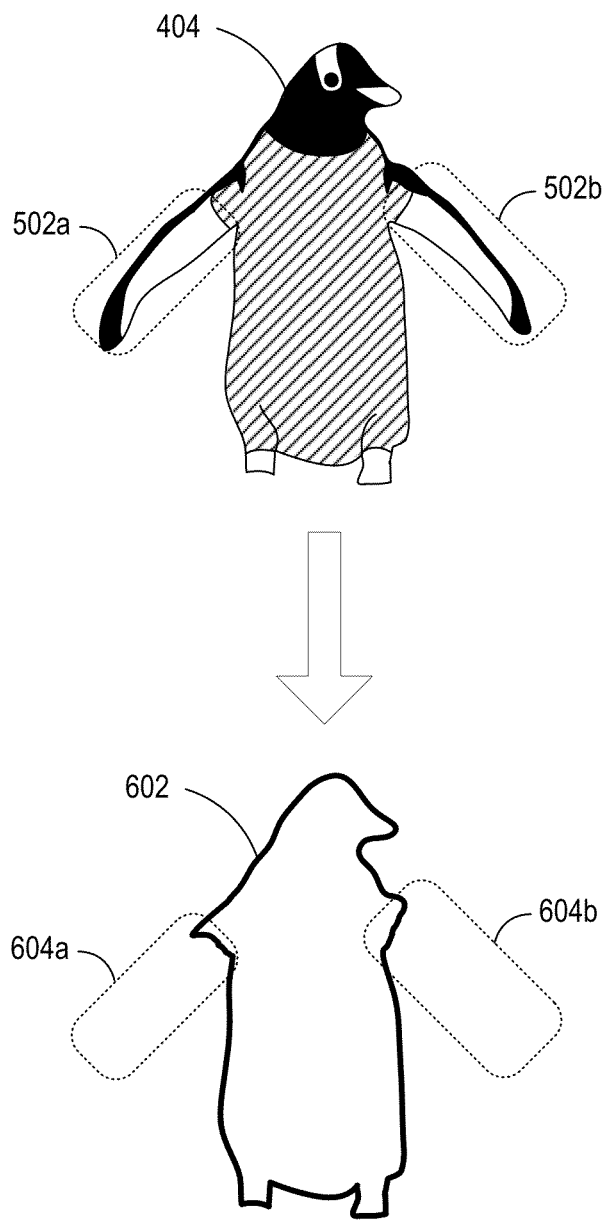
FIG. 6 illustrates truncation of thin regions of an object during the tracking process.

Reference is made to FIG. 6, which illustrates a possible occurrence with conventional segmentation-based tracking systems that rely primarily on color and edge information of the object. As shown, due to the small thickness values of the regions 502a, 502b, it may be difficult to track these portions of the object because the portions of the object with small thickness values usually has a longer contour length, and it is generally more difficult for tracking algorithms to match the entire contour. As a result, the thin portions 604a, 604b may inadvertently be truncated from the contour model 602.

As discussed above, various embodiments incorporate a weighted approach to object tracking by assigning higher weight values to portions of an object 404 that exhibit small thickness values. A contour weighting map is derived and tracking is then performed utilizing both the contour model and the contour weighting map.

Figure 7:
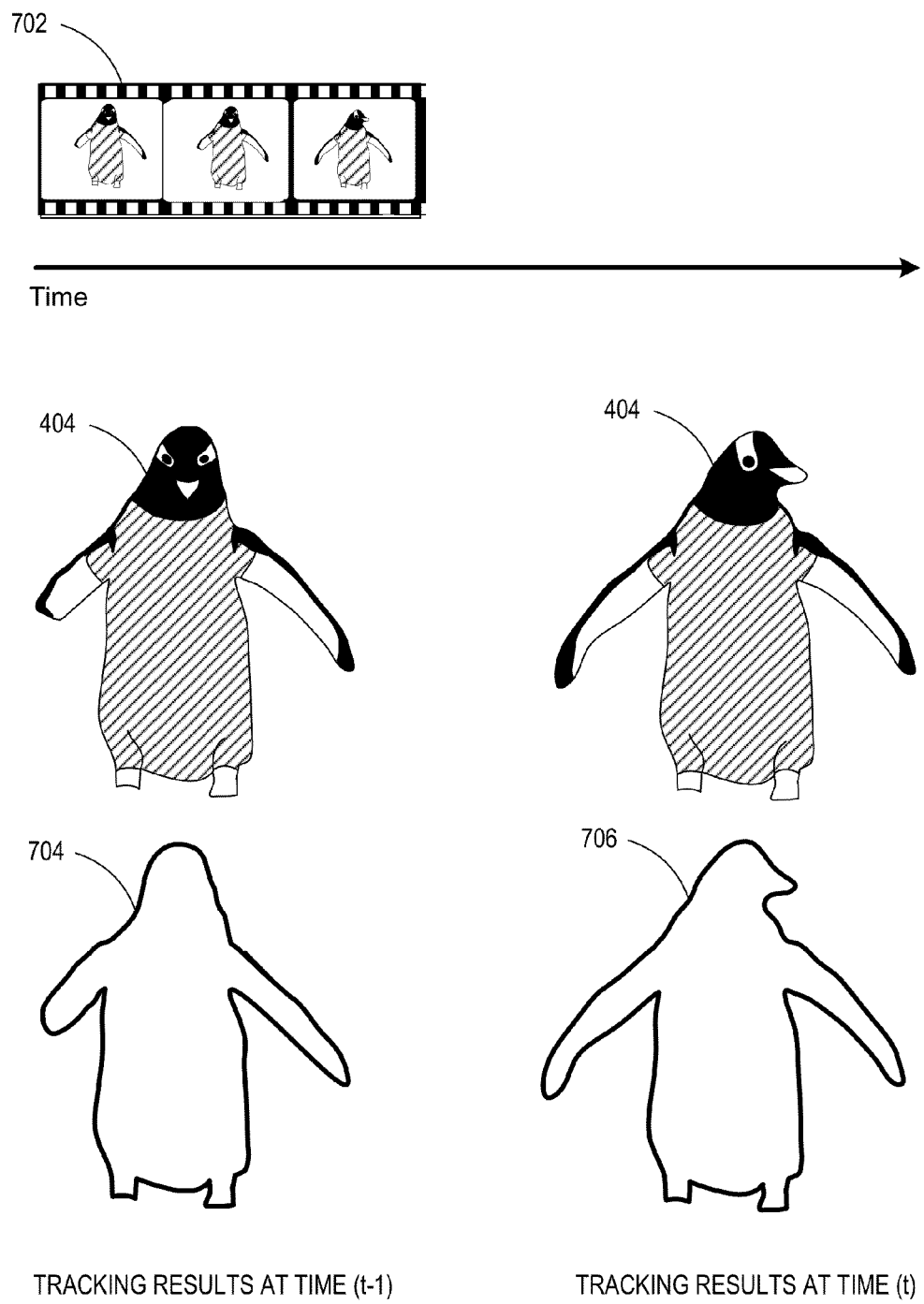
FIG. 7 illustrates the derivation of the contour weighting map by the video editing system of FIG. 1 in accordance with various embodiments of the present disclosure.

To illustrate the derivation of the contour weighting map, reference is made to FIG. 7. Within a plurality of frames 702, a first frame is sampled at time (t-1), and an initial contour model 704 is derived. A second frame is sampled at time (t) and based on the correlation between the objects 404 between the different frames, a contour model 706 is derived. For some embodiments, the contour model may derived based on a temporal prediction method or optical flow information corresponding to a current frame (time (t)) and a previous frame (time (t-1)). For example, points between two frames within the frame sequence 702 may be derived based on, for example, motion estimation and/or optical flow analysis that accounts for the motion orientation of the object 404.

Reference is made to FIGS. 10A-E, which illustrate the tracking operation involving the object contour. For implementations where motion estimation is used, two consecutive frames (FIGS. 10A, 10B) may be used where in the first frame (FIG. 10A), the object contour is known, as represented by the bold line surrounding the object. Based on this, an approximate prediction of the object contour for the second frame (FIG. 10B) is derived, where the prediction is utilized by a tracking algorithm. For some embodiments, motion estimation is applied to derive a temporal prediction. The frame is partitioned into smaller regions, and the movement of each small region is estimated across the two frames. Conventional systems may apply a tracking algorithm to estimate a boundary. For an object with a regular shape (e.g., a circle or a square), implementing a constraint on the total length of the boundary may help to prevent abnormal deformation of the boundary. Note, however, that conventional systems that employ tracking algorithms typically cut or truncate the thinly shaped regions of the tracked object.

In general, only the regions inside or close to the object are analyzed. Specifically, the magnitude and direction of the movement of each small region is determined. FIG. 10C illustrates movement by the various regions located within or close to the object, as represented by the various lines. The length of each line represents the magnitude of the degree of movement, while the direction of each line represents the orientation of the corresponding movement.

Figure 10D:
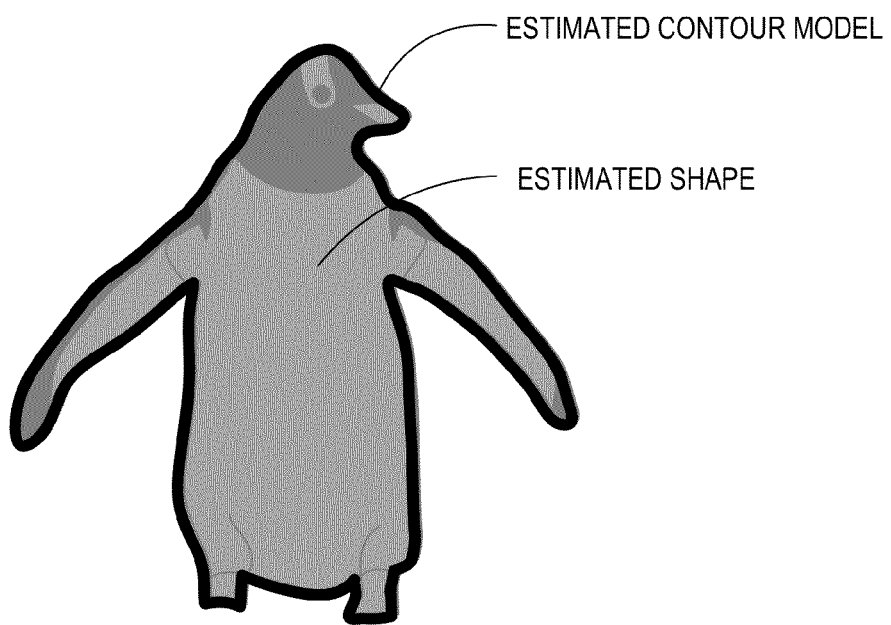
Figure 10E:
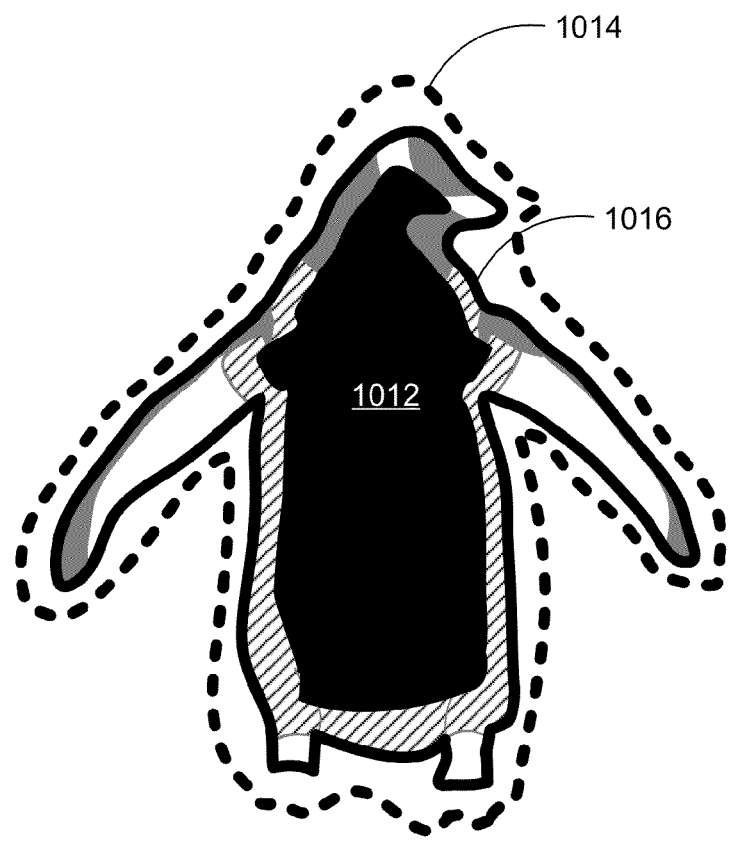

Based on the movement of each of the small regions, the shape of the object contour is adjusted or modified to account for the movement by the object. For example, based on movement of the head and flippers of the penguin in an upward direction, the shape of the object contour is adjusted accordingly in the same direction for tracking purposes. FIG. 10D illustrates the result of adjusting the object contour according to the detected movement of the various regions. Shown in FIG. 10D is an initial estimation of the contour model that is derived from FIG. 10A based on the following steps. Based on the movement determined in FIG. 10C, the original shape of the object is adjusted accordingly, where the shape of the object is depicted by the shaded region within the object. The shaded region represents a rough prediction of the penguin in the second frame shown in FIG. 10B but may not be very accurate in some cases. The contour model is then derived by determining the boundary of the shaded region, where the boundary is represented by the bold line surrounding the object in FIG. 10D. As such, the object tracking algorithm is executed to further refine the object contour based on the rough prediction. With reference to FIG. 10E, the region between the outer region 1014 and the inner region 1012 represents a search range for tracking the object contour, which is determined from the contour model shown in FIG. 10D. The outer region 1014 may be derived, for example, based on a predetermined number of pixels from the original contour. The bold line shown within the search region represents the final estimated contour 1016 derived by the tracking algorithm with the proposed contour weighting map.

Figure 8A:
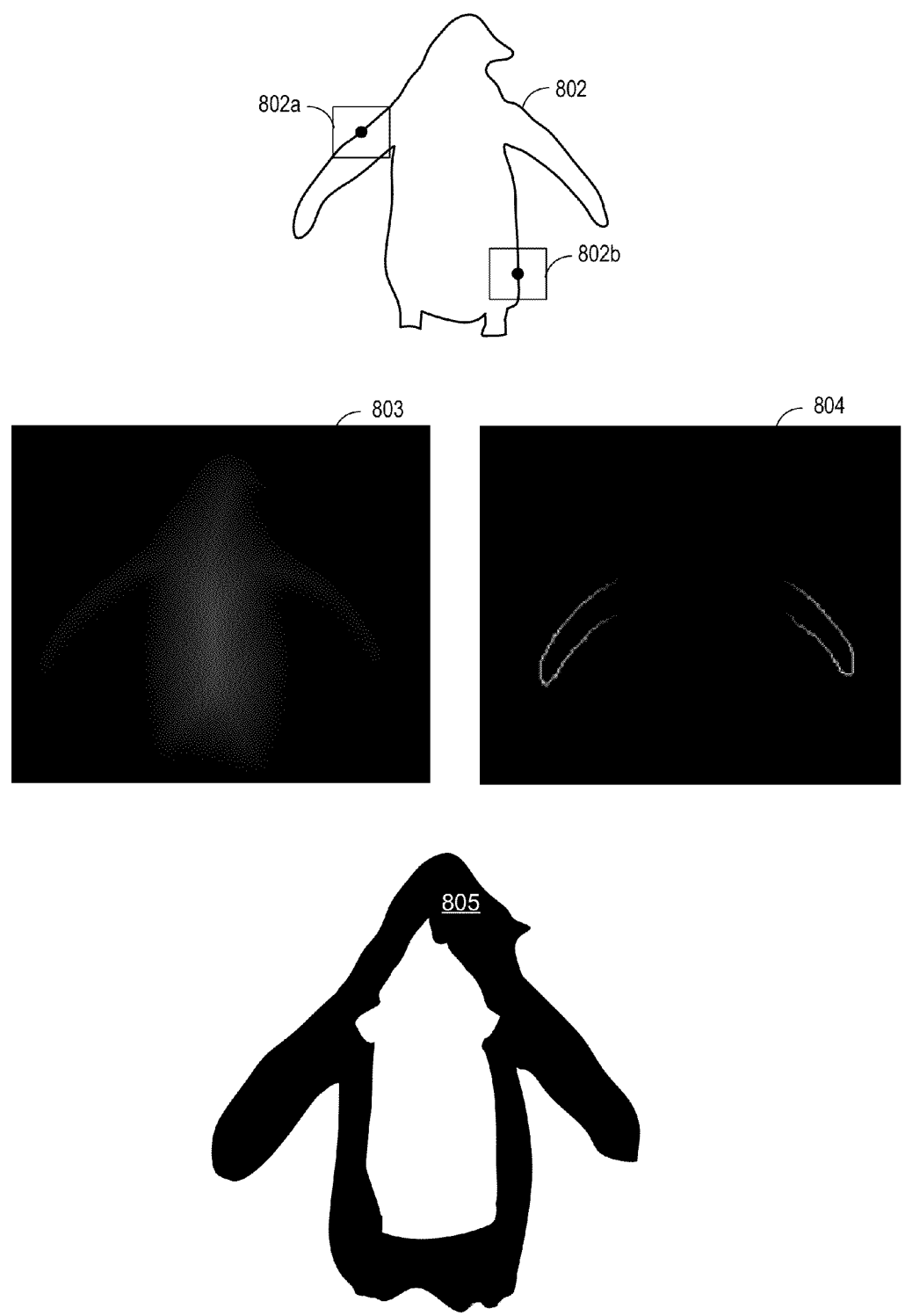
FIGS. 8A, 8B illustrate various aspects relating to an example of a contour weighting map derived by the video editing system of FIG. 1 in accordance with various embodiments of the present disclosure.
Figure 8B:
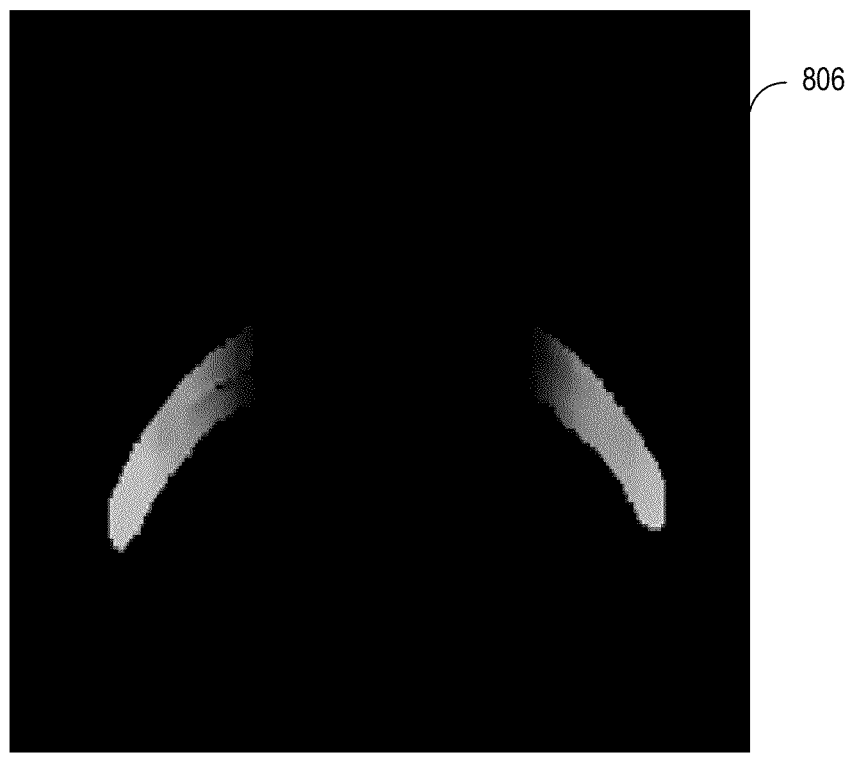

Reference is made to FIGS. 8A and 8B, which illustrate various aspects of an example of a contour weighting map derived for the object 404. For some embodiments, tracking an object in a plurality of frames involves constructing a foreground model according to a tracked region in a prior frame and also constructing a background model according to a region other than the tracked region in the same prior frame or a different prior frame. The prior frame may include, for example, the first frame in the frame sequence. The foreground model refers to the tracked object or tracked region, while the background model refers to the region(s) other than the tracked object.

Pixel probabilities are then estimated according to similarities of pixel values in a current frame with respect to both the foreground and background models. As described above, a distance transform may be applied to the frame sequence 702 (FIG. 7) for purposes of deriving thickness values for different regions of the object 404 (FIG. 7). A distance transform is an image processing method which labels each pixel in the object 404 with the distance to the nearest boundary pixel. The results 803 of the distance transform are shown.

Upon application of the distance transform, the max value, $\delta_i$, within a window 802a, 802b around each boundary pixel, $P_{1-N}$, is derived according to the following expression:

$$\delta_i = \text{Max}_j D(j), j \in \text{window}_{1-N}.$$

In the expression above, D(j) represents a distance function. A small value for $\delta_i$ indicates that the current boundary pixel $P_i$ is located within a "thin" region or portion of the object 404, whereas a large value for $\delta_i$ indicates that the current boundary pixel $P_i$ is located outside a "thin" region or portion of the object 404. The thickness values ($T_i$) may be derived according to the following expression:

$$T_i = K - \delta_j.$$

An example of a boundary mask with weighted values is represented by the boundary weighting mask 804 containing the thickness values ($T_i$) is shown in FIG. 8A, where the visible portions represent small thickness values.

To generate a contour weighting map, a search region is first determined for application of the tracking algorithm, as described above in connection with FIG. 10E. With reference to the search region 805 depicted at the bottom of FIG. 8A, the region between the outer region and the inner region represents a search range 805 for tracking the object contour, which is determined from the contour model shown in FIG. 10D. Turning now to FIG. 8B, weight values are assigned to pixels within the search region 805 (FIG. 8A) and also pixels inside the original contour 802 (FIG. 8A). Upon assigning the weight values, a contour weighting map 806 is generated, as shown in FIG. 8B, whereby pixels in the contour model associated with a thin region (i.e., pixels that exhibit small thickness values) are assigned a relatively higher weight value than those assigned to pixels that lie outside a thin region. The tracking algorithm is adjusted or refined such that more emphasis is placed on tracking the portions of the contour with higher weight values.

The weights in the contour weighting map 806 are assigned according to the boundary weighting mask 804 (FIG. 8A). Specifically, if a pixel is close to relatively large mask values, that pixel will be assigned a high weight value in the contour weighting map 806. Note that for some embodiments, only the pixels located inside the contour are assigned weights. Thus, with reference to the example object comprising the penguin, only the flippers of the penguin are highlighted in the contour weighting map 806, whereas the regions outside of the flippers are not highlighted. As a result, the pixels on the thin region(s) of the object will be given high weight values.

In accordance with various embodiments, the probability map used for tracking the object is then refined according to weight values specified in the contour weighting map 806. The location of the object within the frames is then tracked based on the refined probability map. The probability map may be embodied as a two-dimensional array that stores probability values for pixels in each frame. Typically, the probability values range from 0.0 to 1.0, where a value of 1.0 represents a pixel having the highest level of confidence in terms of being located within the region of the object being tracked. A value of 0.0 represents a pixel having the lowest level of confidence in terms of being located within the region of the object being tracked.

For some embodiments, the probability values of every pixel in the frame are computed. However, for other embodiments, the probability values of only the pixels in the search range (e.g., the region between the outer region 1014 and the inner region 1012 in FIG. 10E) may be calculated as this is generally sufficient for accurately tracking the object. The probability map is computed based on the foreground and background models, where the models are constructed according to predefined features. The predefined features may include, for example, color values or intensity values of pixels. The predefined features may also include texture data of pixels. For example, with regards to color values, the RGB color values of pixels may be utilized.

The foreground and background models for a frame are then constructed by the pixel values in a prior frame based on the following operations. First, the foreground model is generated based on a collection of the color values of the pixels inside the object region, while the background model is generated based on a collection of color values of pixels outside the object region. Note that the frames used to construct the foreground and background models may comprise the same prior frame or a different (prior) frame.

To determine the probability of a pixel, a pixel value corresponding to a feature (e.g., the RGB color value) is compared to the foreground and background models. If the feature is more similar to the foreground model, the pixel is assigned a relatively higher probability value (e.g., one greater than 0.5), otherwise the pixel is assigned a relatively lower probability value (e.g., one less than 0.5). To illustrate, suppose, for example, that the foreground model is constructed based on a collection of pixels with red and yellow color values, while the background model is constructed based on pixels with blue and purple values.

Based on these models, a given red pixel may be assigned a probability value of 0.9. Note that the value is very close to the highest probability value (1.0) as the foreground model contains a red color value. However, the probability value will not be assigned the maximum value (1.0) as purple color values in the background model also bear similarity to the red color of the pixel, so the highest level of confidence is not met that the pixel belongs in the foreground model. As another example, a given cyan pixel may be assigned a probability value of 0.7 as cyan is more to similar to yellow (a color in the foreground model) than blue (a color in the background model). A given green pixel may be assigned a probability value of 0.5 as the color green is equally similar to both yellow and blue. For instances where the frame has a higher color resolution such that the pixels span a larger range of colors, the probability values may be assigned based on a ratio corresponding to the degree of similarity (or difference) with respect to the foreground and background models.

Note that other techniques may also be utilized in analyzing the shape of the object for purposes of assigning weight values in the contour weighting map. For example, such morphological image processing techniques as erosion and dilation may be applied to extract boundary information relating to the object in order to identify regions of the object contour that exhibit a large curvature. This is based, in part, on the assumption that portions of the contour that exhibit a large curvature may be irregular in shape. For some embodiments, a larger weight value will have a greater effect on the tracking algorithm, whereas a relatively smaller weight value will generally have a smaller effect. For some embodiments, a threshold is utilized to evaluate very small curvatures within the contour where those curvature values that fall below the threshold are assigned a zero weight value, thereby having no effect on the tracking algorithm.

Figure 9:
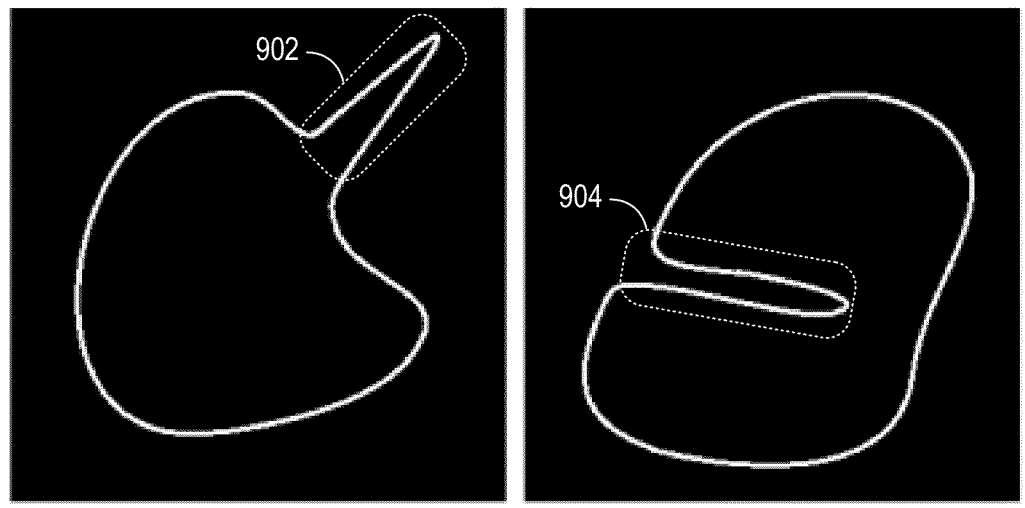
FIG. 9 illustrates various objects with thin regions.

Thus, these portions may be assigned higher weight values in the contour weighting map. To further illustrate, reference is made to FIG. 9, which illustrates the contour of two objects. FIG. 9 shows two examples—one thin portion 902 that is convex and another thin portion 904 that is concave. For both of these examples, a higher weight value would be assigned to the pixels in those regions 902, 904.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A system for tracking an object in a plurality of frames, comprising:

a probability map generator configured to generate a probability map by estimating probability values of pixels in the frame, wherein the probability value of each pixel corresponds to a likelihood of the pixel being located within the object;

a contour model generator configured to identify a contour model of the object based on a temporal prediction method;

a contour weighting map generator configured to derive a contour weighting map based on thickness characteristics of the contour model;

a tracking refinement module configured to refine the probability map according to weight values specified in the contour weighting map; and an object tracker configured to track a location of the object within the plurality of frames based on the refined probability map.

2. The system as claimed in claim 1, wherein the probability map generator is further configured to:

construct a foreground model according to a tracked region in a prior frame;

construct a background model according to a region other than the tracked region in the same or different prior frame; and estimate the probability values according to similarities of pixel values in a current frame with respect to both the foreground and background models.

3. The system as claimed in claim 1, wherein the object tracker is configured to track an object location having a boundary with a highest boundary score, wherein each boundary score is calculated according to at least one of the following:

a total length of the boundary; and the probability values of the pixels in the frame within the boundary representing likelihood of being located within the object, wherein a higher boundary score is assigned in response to the total length of the boundary being shorter or the probability values being higher, and wherein a lower score is assigned in response to the total length of the boundary being longer or the probability values being lower.

4. The system as claimed in claim 1, wherein the tracking refinement module refines the probability map by assigning relatively higher probability values to pixels in a relatively more heavily weighted region in the contour weighting map.

5. The system of claim 1, wherein the contour weighting map generator is configured to assign relatively higher weight values to regions nearby the object contour exhibiting a thin thickness relative to remaining regions nearby the object contour, wherein the contour weighting map generator is further configured to assign relatively lower weight values to remaining regions nearby the object contour.

6. The system of claim 5, wherein the contour weighting map generator is configured to identify regions nearby the object contour exhibiting a thin thickness value by applying a distance transform to determine a distance between each pixel within a region of the contour and a boundary pixel of the contour.

7. The system of claim 1, wherein the contour weighting map generator is configured to identify regions nearby the object contour exhibiting a thin thickness value by applying morphological image processing to extract boundary information relating to the object.

8. The system of claim 1, wherein the contour weighting map generator is configured to identify regions nearby the object contour exhibiting a thin thickness value by identifying a boundary having larger curvature characteristics.

9. The system of claim 1, wherein the contour weighting map generator is further configured to derive the contour weighting map based on a degree of movement by at least a portion of the object, wherein every value in the contour weighting map is assigned a relatively low value responsive to a large degree of movement by the at least a portion of the object.

10. The system of claim 1, wherein elements within the contour weighting map that remain relatively static are assigned relatively higher weight values in the contour weighting map than elements that exhibit a large degree of movement.

11. A non-transitory computer-readable medium embodying a program executable in a computing device for tracking an object in a plurality of frames, comprising:

code that generates a probability map by estimating probability values of pixels in the frame, wherein the probability of each pixel corresponds to a likelihood of the pixel being located within the object;

code that determines a contour model of the object defining a contour of the object;

code that generates a contour weighting map from the contour model according to relatively thin regions within the contour model, wherein thin regions are identified according to thickness values calculated by at least one of a distance measurement and morphological analysis;

code that refines the probability map according to weight values specified in the contour weighting map; and code that tracks a location of the object within the plurality of frames based on the refined probability map.

12. The non-transitory computer-readable medium of claim 11, wherein the code that generates the contour weighting map generates the contour weighting map further based on a degree of movement of the object.

13. A method for tracking an object in a plurality of frames, comprising:

generating a probability map by estimating probability values of pixels in the frame, wherein the probability value of each pixel corresponds to a likelihood of the pixel being located within the object;

determining a contour model of the object defining a contour of the object;

generating a contour weighting map from the contour model according to thickness characteristics of the contour model;

refining the probability map according to weight values specified in the contour weighting map; and tracking a location of the object within the plurality of frames based on the refined probability map.

14. The method of claim 13, further comprising:

constructing a foreground model according to a tracked region in a prior frame;

constructing a background model according to a region other than the tracked region in the same or different prior frame; and estimating the probability values according to similarities of pixel values in a current frame with respect to both the foreground and background models.

15. The method of claim 13, wherein tracking the object comprises tracking an object location having a boundary with a highest boundary score, wherein each boundary score is calculated according to at least one of the following:

a total length of the boundary; and the probability values of the pixels in the frame within the boundary representing likelihood of being located within the object, wherein a higher boundary score is assigned in response to the total length of the boundary being shorter or the probability values being higher, and wherein a lower score is assigned in response to the total length of the boundary being longer or the probability values being lower.

16. The method of claim 13, wherein refining the probability map according to weight values specified in the contour weighting map comprises assigning relatively higher probability values to pixels in a more heavily weighted region in the contour weighting map.

17. The method of claim 13, wherein the thickness characteristics are used to calculate thickness values corresponding to elements within the contour model, and wherein elements within the contour weighting map having relatively lower thickness values are assigned relatively higher weight values in the contour weighting map.

18. The method of claim 17, wherein thickness values are determined based on determining, for each pixel, a distance from the pixel to a boundary of the object.

19. The method of claim 17, wherein thickness values are determined based on applying morphological image processing to extract boundary information relating to the object.

20. The method of claim 13, wherein values in the contour weighting map are higher in areas having thinner thickness values.

21. The method of claim 13, wherein every value in the contour weighting map is assigned a relatively low value responsive to a large degree of movement by at least a portion of the object.

22. The method of claim 13, wherein elements within the contour weighting map that remain relatively static are assigned relatively higher weight values in the contour weighting map than elements that exhibit a large degree of movement.

23. The method of claim 13, wherein determining the contour model of the object defining the contour of the object is performed based on a temporal prediction method.

24. The method of claim 13, wherein determining the contour model of the object defining the contour of the object is performed based on optical flow information.

* * * * *